United States Patent Office 3,271,421
Patented Sept. 6, 1966

3,271,421
PROCESS FOR THE POLYCONDENSATION OF FURFURYL ALCOHOL
Mohammed Anwar Akbar, Bergen-Enkheim, and Herbert Simonis, Konigstein, Taunus, Germany, assignors to Hans J. Zimmer Verfahrenstechnik, Frankfurt am Main, Germany, a corporation
No Drawing. Filed Nov. 27, 1962, Ser. No. 240,401
Claims priority, application Germany, Dec. 9, 1961, Z 9,132
11 Claims. (Cl. 260—347.8)

This invention relates to a process for the condensation of furfuryl alcohol.

Due to its chemical constitution, furfuryl alcohol is capable of both condensation through the terminal hydroxyl groups and polymerization by splitting of double bonds of the furan nucleus. Condensation results in molecules which are extended in the form of chains, while polymerization through the unsaturated bonds gives cross-linked brittle products. Furfuryl alcohol reacts with as little as traces of concentrated mineral acid with explosive violence and with total resinification. Many attempts have been made to set a sharp limit between polycondensation and polymerization of furfuryl alcohol. This requires adherence to very exact reaction conditions because polycondensation also liberates large amounts of heat which must be removed thoroughly if control of the reaction is not to be lost and if polymerization starting at higher temperatures is to be prevented. Condensation of furfuryl alcohol has been effected at temperatures of below 100° C. and in the presence of water as solvent and diluent to produce commercially usable polycondensates. It is further known to polycondense furfuryl alcohol in dilute aqueous solution at temperatures of not more than 40° C. without the supply of heat and in the presence of dilute hydrochloric acid. However, the presence of an aldehyde or chlorohydrin is necessary to initiate this reaction. These prior art processes of polycondensation, owing to side reactions, frequently lead to products which are not satisfactory in commercial use, this being particularly due to the fact that the products give brittle resins which are difficult to process due to by-products being split off in curing and a more or less high content of monomers.

Many attempts have been made to achieve better control of the polycondensation and to prevent side reactions such as polymerization and polyaddition as far as possible. According to German Patent 1,032,544, furfuryl alcohol is condensed in a highly dilute aqueous solution in the presence of acid catalysts while exactly maintaining a temperature within the range of between 40 and 60° C. and specific pH values of the aqueous phase of between 2 and 2.5. Satisfactory results in this process are dependent upon strict adherence to the temperature and pH conditions. While the removal of the heat of reaction is satisfactorily controlled in the beginning of the process due to the great dilution, it becomes difficult if, during the course of the polycondensation, the higher condensed reaction products precipitate from the aqueous phase and the reaction mixture becomes non-homogeneous. After appearance of the non-aqueous phase, local overheating and consequently undesirable side reactions may take place. Moreover, the precipitated polycondensates dissolve a certain proportion of the monomers which then participates no longer in the reaction and must be removed from the finished polycondensate by special operations. Therefore, the maximum yield of this prior art process is only about 81% under optimum conditions.

It has now been found that a substantially improved control of the condensation of furfuryl alcohol is possible and increased yields of high quality condensation products can be obtained by polycondensing furfuryl alcohol in a homogeneous phase in non-aqueous organic solvents forming azeotropes with water and in the presence of acid catalysts and polymerization inhibitors with simultaneous removal of the water formed in the reaction and discontinuing the reaction after the chain length desired has been reached, but not later than upon termination of the elimination of water.

As is known, polycondensations are favored by azeotropic distillation of water. Therefore, one would have expected that the polycondensation of furfuryl alcohol which anyhow proceeds with excessive violence in most cases and then leads to poor products would also be intensified by azeotropic removal of the water and consequently more difficult to control. However, it has been found surprisingly that polycondensation under the conditions described above initially proceeds only to a certain degree, which can be followed easily by measuring the amount of water distilling azeotropically per unit time. Upon termination of the elimination of water, there takes place a spontaneous increase in temperature which can only be explained by the start of an undesirable polymerization. The reaction product thus obtained is no longer usable for copolymerizations.

The process of the invention is characterized by the fact that it is operated in the homogeneous phase throughout the reaction by constantly distilling off the water formed in the condensation as azeotrope with the organic solvent so that the water is not capable of forming a separate phase. The water-solvent azeotrope can be separated into the individual phases after condensation. In this manner, the amount of water distilling over can be controlled exactly and the organic solvent returned into the reaction mixture. At the same time, evaporation of the solvent constantly removes reaction heat and thereby safely avoids superheating of the reaction mixture. Moreover, constant removal of the water formed in the polycondensation has the essential advantage that the polycondensate produced is free from water. Operation in a homogeneous phase throughout the polycondensation has the advantage of substantially complete utilization of the furfuryl alcohol charged so that yields of the polycondensates desired of more than 90%, based on furfuryl alcohol charged, are obtained.

The solvents used are advantageously those organic solvents which permit operation in a homogeneous phase until the degree of condensation desired is reached. In particular, the use of anhydrous aliphatic or aromatic hydrocarbons which form azeotropes with water such as, for example, benzene or toluene, has been found to be very desirable.

As is known per se, the process of the invention is carried out in the presence of acid catalysts which must be soluble in the reaction mixture in the small amounts used. Examples of suitable catalysts include sulfuric acid, phosphoric acid, β-naphthalene sulfonic acid or p-toluene sulfonic acid, the latter being particularly preferred. The acid catalyst may, if necessary, be dissolved in an additional solvent, e.g. acetone, and added as a solution to the reaction mixture. The amount of acids added to the reaction mixture ranges between 0.01 and a maximum of 1% and preferably between about 0.05% and 0.2%, based on the amount of furfuryl alcohol charged. However, it appeared surprisingly that exact control of the acidity of the organic phase is not necessary in the process of the invention.

Another essential feature of the invention is the addition of polymerization inhibitors to the homogeneous reaction mixture. These should be readily soluble in the reaction mixture without neutralizing the acid catalyst or otherwise interferring with the polycondensation. Particularly suitable inhibitors have been found to be the nitrophenols such as, for example, o-nitrophenol, m-nitrophenol, p-nitrophenol, 2,3-dinitrophenol, 2,4-dinitrophenol, 2,6-dinitrophenol, 3,5-dinitrophenol and picric acid which is particularly preferred. The amounts used of the polymerization inhibitors mentioned above range between about 0.1 and 1%, based on furfuryl alcohol used. These amounts are sufficiently low that even discoloration by the nitrophenols used, e.g. yellowing of the picric acid, is no longer perceptible in the finished resins.

The reaction temperature also needs not be controlled exactly in the new process for the polycondensation of furfuryl alcohol. In any case, it ranges below 100° C. and generally between 60 and 80° C. depending upon the boiling point of the azeotrope consisting of water and the particular inert organic solvent used. It is desirable for the reaction mixture to be prepared at room temperature, then gradually heated to the reaction temperature and kept at this temperature for several hours. The reaction period is dependent upon the degree of condensation desired or upon the chain length of the resultant linear macromolecules. Since a direct relaxation exists between the degree of condensation desired and the water escaping in the condensation, it can be read off from the amount of water removed and the reaction is then discontinued when the chain length desired is reached but not later than upon termination of the elimination of water.

Upon termination of the polycondensation, the reaction product which is a more or less viscous liquid depending upon the reaction period may be readily freed from the solvent by distilling off the latter, this distillation being preferably effected under reduced pressure. The resultant polycondensate is stable in storage without any immediately following treatment and constitutes an excellent raw material of resins for paints and varnishes and of casting resins. If necessary, it may be freed from acids by washing with water.

The condensation resin of the invention is free from monomeric furfuryl alcohol and contains at best traces of other low molecular weight compounds. Therefore, washing for the removal of monomers or low molecular weight by-products, which removal is absolutely necessary in case of all prior art processes, is not necessary in case of the process of the invention. The linear polycondensate produced is outstandingly suited for copolymerization with compounds having polymerizable double bonds. Particularly useful copolymers are those of the linear condensate with diethyl maleate. Copolymerization is carried out in a manner known per se with the use of acid catalysts, curing taking place within a more or less short period of time depending upon the concentration and acidity of the catalyst. The products thus produced are free from bubbles, non-brittle and, due to their good mechanical properties and simultaneous high chemical resistance and safeness from the physiological point of view, usable for various commercial applications as casting resins with and without fillers such as, for example, glass fibers and/or pigments.

Moreover, the linear polycondensates produced in accordance with the invention are excellent raw materials of lacquers and varnishes and superior in this respect to the previously known raw materials based on furfuryl alcohol, particularly in view of the higher chemical resistance, especially to alkalis, and the higher thermal stability. For use, the linear polycondensate is mixed with a conventional solvent and gives extremely tightly adhering and resistance varnishes when baked at temperatures of about 180° C.

The following examples are given by way of illustration and not limitation. Example 1 describes a comparative test illustrating the spontaneous increase in temperature after a specific polycondensation period, which results in products of little use indicating that the polycondensation, in accordance with the invention, is to be discontinued not later than before this spontaneous increase in temperature.

*Example 1*

196 grams of 2-furfuryl alcohol and 200 mg. of p-toluene sulfonic acid were dissolved in 58 grams of acetone and the solution was mixed with 500 ml. of benzene in a stirring flask under a nitrogen atmosphere and the mixture was precondensed for several hours at about 60° C. To effect the main condensation, the temperature was slowly increased to 80° C. and maintained at this level. The reaction water which was formed was continuously removed by azeotropic distillation. After about 3 hours, elimination of water ceased and an abrupt increase in temperature to more than 90° C. was observed in the reaction mixture without an increased supply of extraneous heat. After removal of the benzene by distillation, the resultant reaction product was not copolymerizable with other polymerizable monomers such as styrene or diethyl maleate.

*Example 2*

196 grams of 2-furfuryl alcohol, 58 gms. of acetone, 300 mg. of p-toluene sulfonic acid, 200 mg. of picric acid and 850 ml. of benzene were precondensed in a stirring flask under a nitrogen atmosphere, the precondensation being first effected at 40° C. and then for 3 hours at 60° C. Thereafter the temperature was increased to 80° C. and the condensation water which was formed was continuously removed by azeotropic distillation. After about 3.5 hours, the reaction was discontinued, the benzene distilled off under reduced pressure without any difficulty and the raw product washed with a total of 1,500 ml. of water and dried. There was obtained a 90% yield of a viscous resin which was readily soluble in organic solvents. Hundred grams of this polycondensate were subsequently dissolved in the same amount of diethyl maleate, and 1 gram of p-toluene sulfonic acid was added as the catalyst. The reaction mixture was cured at 80° C. This resulted in a faintly colored, pore-free, non-brittle copolymer which exhibited all of the characteristics which are favorable for a coating resin.

The example was repeated under the same conditions except thta 500 mgs. of 2,4-dinitrophenol were used in place of 200 mgs. of picric acid. The properties of the linear polycondensate produced and of the products prepared therefrom were identical with those of the products prepared with the use of picric acid.

*Example 3*

960 grams of 2-furfuryl alcohol were mixed with 2170 grams of toluene and 0.85 gram of picric acid and a solution of 1.25 grams of p-toluene sulfonic acid in 200 ml. of methanol. The mixture was precondensed for several hours at about 60° C. in a stirring flask. The temperature was increased to the boiling point and the reaction water formed was removed by azeotropic distillation. The reaction was discontinued when 110 ml. of $H_2O$ had passed over. After cooling to about 60° C., the reaction mixture was neutralized with the stoichiometrical amount of alcoholic KOH (22.5 ml. N/2), following which the toluene was distilled off under a slightly reduced pressure. The remaining residue had a viscosity of 40 DIN seconds (measured in the DIN beaker with 4 mm. orifice at 20° C.).

Hundred grams of the polycondensate thus prepared were mixed with 10 grams of a 0.3% solution of p-toluene sulfonic acid in methylethyl ketone to give a baking varnish having a pot life of more than 24 hours. The varnish which was applied by means of a spray gun to the substrate to be varnished and baked for 45 minutes at about 180° C. was free from pores and blisters and had excellent resistance to chemicals, even to a boiling 20% sodium hydroxide solution. The bond strength to primed metal sheet was excellent.

The experiment was repeated with the use of 1.5 grams of p-nitrophenol. The properties of the resultant polycondensation resin and the baking varnishes prepared therewith were identical with those of the products obtained with the use of picric acid as the polymerization inhibitor.

What is claimed is:

1. A process for the condensation of furfuryl alcohol which comprises polycondensing in homogeneous phase at a temperature below 100° C. furfuryl alcohol in a non-aqueous organic solvent forming azeotropes with water in the presence of between about 0.01 and 1% referred to the furfuryl alcohol of an acid catalyst and between about 0.1 and 1% referred to the furfuryl alcohol of a polymerization inhibitor under simultaneous removal of the water formed in the reaction and discontinuing the reaction after the chain length desired has been attained but not later than upon termination of water elimination.

2. Process according to claim 1 which comprises utilizing between about 0.05 and 0.2% of said acid catalyst.

3. Process according to claim 1 which comprises effecting said polycondensation at a temperature of from 60 to 80° C.

4. Process according to claim 1 wherein said polymerization inhibitor is a member selected from the group consisting of m-nitrophenol, p-nitrophenol, 2,3-dinitrophenol, 2,4-dinitrophenol, 2,6-dinitrophenol, 3,5-dinitrophenol, and picric acid.

5. Process according to claim 1 wherein said polymerization inhibitor is picric acid.

6. Process according to claim 1 wherein said acid catalyst is a member selected from the group consisting of sulfuric acid, phosphoric acid, β-naphthalene sulfonic acid, and p-toluene sulfonic acid.

7. Process according to claim 1 wherein said acid catalyst is p-toluene sulfonic acid.

8. Process according to claim 1 wherein the water formed in the reaction is removed by distilling off the azeotrope with the organic solvent.

9. Process according to claim 1 wherein said organic solvent is a member selected from the group consisting of aliphatic and aromatic hydrocarbons.

10. Process according to claim 1 wherein said organic solvent is benzene.

11. Process according to claim 1 wherein said organic solvent is toluene.

References Cited by the Examiner

UNITED STATES PATENTS

| | | | |
|---|---|---|---|
| 2,681,896 | 6/1954 | Nielsen | 260—88.5 |
| 2,698,319 | 12/1954 | Brown et al. | 260—88.5 |
| 3,055,844 | 9/1962 | Jaffe et al. | 280—88.5 |
| 3,158,592 | 11/1964 | Nielsen | 260—88.5 |

FOREIGN PATENTS

| | | |
|---|---|---|
| 1,032,544 | 6/1958 | Germany. |

JAMES A. SEIDLECK, *Primary Examiner.*

JOSEPH L. SCHOFER, *Examiner.*

H. WONG, *Assistant Examiner.*